United States Patent Office 3,310,794
Patented Mar. 21, 1967

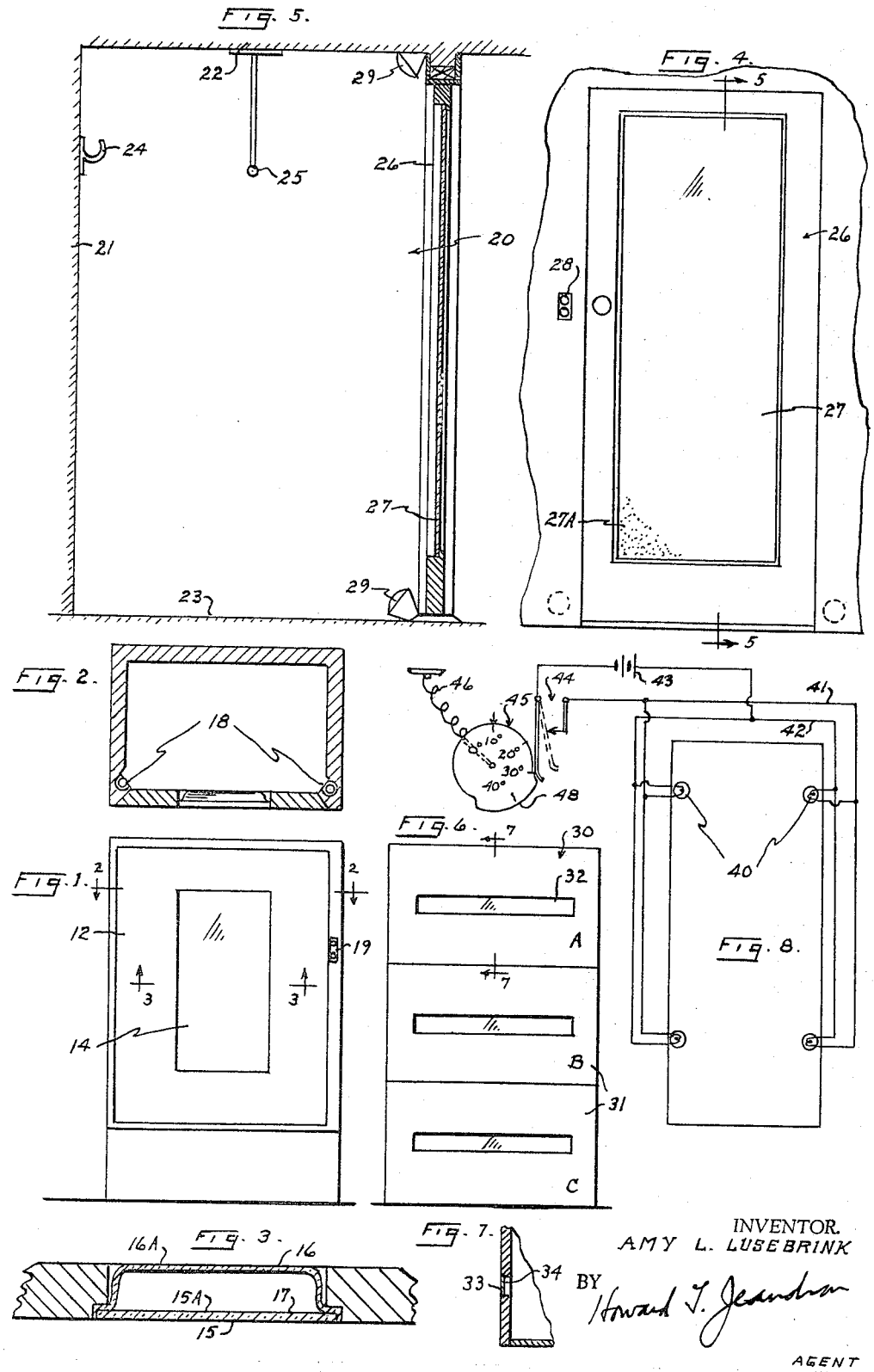

3,310,794
CABINET WITH DOOR HAVING A VIEWING AREA COVERED WITH SEMI-TRANSPARENT REFLECTIVE MATERIAL
Amy L. Lusebrink, 7 Avalon Drive, New Shrewsbury, N.J. 00724
Filed Dec. 27, 1963, Ser. No. 333,865
4 Claims. (Cl. 340—227)

This invention relates to the combination of closets or cabinets provided with a closure door having a viewing area and in which the viewing area is comprised of a transparent material which on one side provides a high percentage of transmission of light from the interior of the cabinet through the door outward, while providing a high degree of reflectance of light from the exterior of said door to produce a semi-transparency from the outside, and in which a light or lights of a preferred spectral emission and desired emissive wave length are provided on the inside of the closet or cabinet to provide a good penetration of said light through said transparent material.

The treatment of transparent material such as glass or plastic to produce a commonly called one way mirror is old in the art. In this particular instance the glass is treated on one side with reflective material to a high degree so that light from the one side of the glass is partially reflected and normally there is little transparency from that side of the glass. However the glass remains semi-transparent for the viewer looking through the mirror glass from the opposite side toward the light. In this particular instance the one way mirror is primarily concerned with a coating on one side of the glass to produce a high degree of reflectance and by maintaining a low density of the reflective coating, the semi-transparency of the glass from the opposite direction is maintained. This type of glass is used primarily to reflect the strong rays of the sun for buildings while permitting the occupant to have a fairly good transparency from the inside for viewing outward. This particular glass being primarily a mirror is treated with the commonly used mirror backings such as silver or aluminum coating to permit the semi-transparency.

It is an object of this invention to provide a combination of a closet or cabinet in which the closure door is provided with a viewing area and in which the viewing area is covered with a transparent material and in which the transparent material is coated on one side with a reflective coating of a low density to provide a reflection of light from the outside of the closet or cabinet and in which a light or lights are provided on the inside to permit the reflecting image of the interior of the closet or cabinet through the transparent material so that it may be readily recognizable by the human eye from the exterior.

A further object of this invention is to provide a combination of a closet or cabinet in which the closure door is provided with a viewing area and in which the viewing area is covered with a transparent material and in which the transparent material is coated on one side with a reflective coating of a low density to provide a reflection of light from the outside of the closet or cabinet and in which a light or lights of a specific spectral color and emissive wave length are provided on the inside to permit the reflecting image of the interior of the closet or cabinet through the transparent material so that it may be readily recognizable by the human eye from the exterior.

It is a further object of this invention to provide a combination of a closet or cabinet in which the closure door is provided with a viewing area and in which the viewing area is covered with a transparent material and in which the transparent material is coated on one side with a minimum density coating comprised of mirror particles to produce a high degree of reflectance and retain a semi-transparency and in which a light or lights are provided on the inside to permit the reflecting image of the interior of the closet or cabinet through the semi-transparent material so that it may be readily recognizable by the human eye from the exterior.

Other objects of this invention shall be apparent by reference to the accompanying detailed description and the drawings in which FIG. 1 illustrates an elevational view of a cabinet such as a refrigerator, FIG. 2 is a cross sectional view taken on line 2—2 of FIG. 1, FIG. 3 is an enlarged cross sectional view taken on line 3—3 of FIG. 1, FIG. 4 is an elevational view of a door for a closet, FIG. 5 is a cross sectional view taken on line 5—5 of FIG. 4, FIG. 6 is an elevational view of a further embodiment of this invention, FIG. 7 is a cross sectional view taken on line 7—7 of FIG. 6, and FIG. 8 is a schematic wiring diagram of a still further embodiment of this invention.

Referring to FIG. 1 there is illustrated an example of a closet in the form of a refrigerator 10. In this instance refrigerator 10 comprises a box 11 with a door 12. The door 12 is provided with a viewing area 14. Mounted in the viewing area is a transparent window 15 which in this instance is provided as a double window 16 and 17 to insure the insulation as required for a refrigerator. The double window 16 and 17 is generally formed with a vacuum seal to provide the utmost in insulation. The box 11 is also provided with interior lights 18 that are controlled by an exterior switch 19. The lights and switch are connected to the usual house current used in operating the refrigerator. Referring to FIG. 3 the window 16 and 17 are normally a material such as glass having a high degree of transparency. With this type of window it is easy to see into the inside of the cabinet. However it is not a desirable exterior finish from an aesthetic point of view. In order that the window 15 may be treated to harmonize with the color of the exterior of the closet (refrigerator) the window 15 must be coated and the coating must be of a special nature to prevent completely obscuring the transparency of the window 15. The coating must have a high reflectance and low density. The color may be any light color to match the exterior of the closet. The coating particles should not cover more than 50% of the viewing area. In this instance the coating should be applied to the area 16A or 15A of glass 16. The coating may also be a mirror coating such as silver or aluminum particles of a mirror size. The manner of coating the area 16A is preferably by vacuum deposition, electro-static spray, pneumatic spray or silk screen process. Although the coating is suggested for the surface 16A it may also be provided on the surface 16B. The coating provided on the glass or transparent material is necessarily composed of micro particles of low optical density, where density is defined as log transmission, for example, with a density of 0.3 there will be a transmission of approximately 50%.

Referring to FIGS. 4, 5 and 6 there is illustrated a cross section of a typical house closet 20 having a rear wall 21, ceiling 22, floor 23, a plurality of hooks or hangers 24 and a clothes hanging bar 25 and a closure door 26 provided with a transparent material 27 covering the viewing area of the door. The closet 20 is also provided with a plurality of lights 29 and an exterior switch 28. The switch 28 is connected by wiring (not shown) to the lights 29 to control their illumination. In this embodiment of this invention the glass 27 is coated on the inner side or closet side with a reflective paint as already described in the previous embodiment.

In carrying out the intention of this invention the transparent material covering the viewing area must be treated on one surface with the minimum density reflective coating and the coating must be applied in the manner already described to insure the minimum density. The low density particles in effect become a low density filter and due to the fact that when the coating is applied, the area actually covered by the particles 27A does not exceed 50% of the transparent area. Thus the uncovered areas allow an unobstructed view through the transparent material in effect making it a semi-transparent material. A further consideration in this invention is the use of the lights 18 and 29 in combination with the reflective coating applied to one surface of the transparent material. Although a light of normal illumination would provide a degree of reflectance through the coated transparent material, in order that a maximum reflective effect may be produced from the interior of the cabinet or closet, the spectral emission of the interior light is important as the particular portion or color of the light spectrum should be carefully chosen. For example, a white coating on the transparent material would best be penetrated rather than absorbed with a lamp with a high green spectral output. The light utilized should possess sufficient power to emit in wave lengths that will penetrate the transparent material rather than be absorbed by the transparent material. The wave lengths are of course those that fall in the high spectral sensitivity region of the human eye. Thus in each instance where a color is to be utilized on the transparent material a particular lamp color will be chosen to provide the desired degree of reflectance without losing too much of the light by absorption in the transparent material. Although various colored reflecting coatings may be utilized, to be included are the already colored glass or plastic that may be coated on the one side with a mirror type reflectant such as silver particles or aluminum flakes. Thus it is apparent that in either embodiment the glass or transparent material may be treated with a reflective coating of any color and colored glass may be used with a reflecting coating on one side for aesthetic reasons to give the door the appearance of a normal door, and to provide a door having little or on transparency from the outside due to the reflective quality of the coating, but providing a viewing area in a door that becomes semi-transparent when the interior of the closet or cabinet is illuminated to permit the operator or user to scrutinize the interior or to carefully examine the interior before opening the door.

Referring to FIGS. 6 and 7 there is illustrated a still further embodiment of this invention in which there are a plurality of drawers 30 such as in a freezing compartment having sections A, B and C. In this instance the front face 31 of the drawer 30 is provided with a viewing aperture 32. The viewing aperture 32 is covered with a semi-transparent reflective material 33 similar to the material disclosed in the prior embodiments. The aperture 32 may take various forms, however in this embodiment it is illustrated as an elongated rectangular narrow slot to give sufficient area for inspecting the interior of the drawer. In this embodiment the interior of the drawer (not shown) shall be illuminated in the same manner as illustrated in the previous embodiments. FIG. 7 illustrates a cross sectional view showing the manner in which the semi-transparent material is mounted. And as in the previous embodiment the semi-transparent material 33 is a window provided with a reflective coating 34 on one side as in previous embodiments the light from the exterior is reflected while the illumination on the interior can be viewed from the exterior. Referring to FIG. 8 there is illustrated a further embodiment of this invention. FIG. 8 illustrates a schematic showing of a wiring diagram that may be installed in connection with FIGS. 1 and 2 or FIGS. 4 and 5 or FIG. 6. The circuit of FIG. 8 comprises a plurality of lights 40 connected by a two wire circuit 41 and 42. The circuit in turn connected to a battery 43 and a switch 44, the switch 44 is in turn actuated by a thermal element 45. The thermal element 45 may be in the form of a bi-metallic thermal responsive element 46 which is set by the user at a desired freezing temperature, for example, 30° indicating that the refrigerator, freezer or cold closet is to be maintained at 30°. However in the event the circuit is broken or power is cut off or any other defect in the maintenance of the desired temperature, the thermal responsive element 46 will turn the thermal element 45 which is provided with a cam area 48 to bear against switch 44 closing switch 44 and energizing the circuit through a battery 43 and the two wire system 41 and 42 to illuminate the lamps 40. This will indicate that the temperature in the compartment is above the desired setting and will in effect produce an alarm or indication as with this circuit and lights installed in any of the previous embodiments the illumination of the interior of the compartment becomes apparent through the semi-transparent material or window and indicates that the freezing temperature is not being maintained. The lamps 40 may also be connected to the door switch so that they will be illuminated by the opening of the door as is presently designed into most refrigerators and freezers.

Various changes may be made, that is, any closed area may be provided with this particular type of semi-transparent viewing area as a complete unit installation in which the interior of closed area is provided with a light or lights and although a single viewing area has been described, the drawers illustrated in FIG. 6, for example, may be divided into a plurality of areas and any one or more areas may be so treated without departing from the spirit of this invention. Although we are primarily concerned with illuminating the interior of a compartment so that it may be viewed from the exterior there are further ramifications to be considered, the interior of the compartment may also be coated with a reflective material to increase the degree of reflection from the lamps or lights and although we have stated that certain colors or portions of the spectrum provide a light that will penetrate the transparent material where it is also colored instead of the light being diffused by the transparent material we may also use different color lights or lamps on the interior especially where there are a plurality of compartments, for example, as in FIG. 6, we may use a red glow in compartment A, a green glow in compartment B and a yellow glow in compartment C so that the different colors may be used to associate with particular items assisting in the use of the freezer to easily distinguish where certain products are. Thus there may be variations in the color of the light utilized and in the distribution of the lights without departing from the spirit of this invenion and this invention shall be limited only by the appended claims.

What is claimed is:

1. A cabinet which includes a closure door, said closure door having a viewing area, a transparent material covering said viewing area, said transparent material coated up to a 50% deposition on the side facing the interior of the cabinet, said coating having a high degree of reflection and composed of micro particles of low optical density, a plurality of lamps within said cabinet, said lamps chosen for their spectral output of a particular wave length to penetrate the particular color coating chosen, a switch outside of said cabinet, said switch connected to said lamps to turn them on or off.

2. In a device according to claim 1 in which the reflective coating is of a color to match the exterior color of the cabinet.

3. A cabinet which includes a closure door, said closure door having a viewing area, a transparent colored material covering said viewing area, said transparent material coated with colored particles up to a 50% deposition on the side facing the interior of the cabinet, a coating having a high degree of reflection on the side facing the exterior of the cabinet and composed of micro particles of low optical density, a plurality of lamps within said cabinet said lamps chosen for their spectral output to penetrate the particular color coatings chosen and a thermal switch mounted within said cabinet, said switch connected to said lamps to turn them on and off, colored light means to indicate the temperature within said cabinet is above the pre-determined setting.

4. In a device according to claim 3 in which the coating having a high degree of reflection is a color to match the color of the cabinet and in which the light from the interior of the cabinet is a different color.

References Cited by the Examiner

UNITED STATES PATENTS

| | | | |
|---|---|---|---|
| 388,934 | 9/1888 | Trapp. | |
| 2,059,689 | 11/1936 | Gilbane | 340—227 X |
| 2,100,908 | 11/1937 | Merdan | 340—227 X |
| 2,104,079 | 1/1938 | Kahn | 88—14 |
| 2,847,901 | 8/1958 | Sassaman et al. | 88—14 X |
| 3,028,586 | 4/1962 | Reda | 340—227 |
| 3,203,052 | 8/1965 | Curtis | 88—1 X |

NEIL C. READ, *Primary Examiner.*

D. YUSKO, R. M. ANGUS, *Assistant Examiners.*